United States Patent
Lee et al.

(10) Patent No.: US 11,534,918 B2
(45) Date of Patent: Dec. 27, 2022

(54) DEVICE AND METHOD FOR CONTROLLING COOPERATIVE ROBOT

(71) Applicant: HANWHA CO., LTD., Seoul (KR)

(72) Inventors: Youn Lee, Changwon-si (KR); Chang Woo Song, Changwon-si (KR)

(73) Assignee: Hanwha Co., Ltd., Seoul (KR)

( * ) Notice: Subject to any disclaimer, the term of this patent is extended or adjusted under 35 U.S.C. 154(b) by 171 days.

(21) Appl. No.: 16/643,680

(22) PCT Filed: Nov. 6, 2017

(86) PCT No.: PCT/KR2017/012466
§ 371 (c)(1),
(2) Date: Mar. 2, 2020

(87) PCT Pub. No.: WO2019/054558
PCT Pub. Date: Mar. 21, 2019

(65) Prior Publication Data
US 2020/0269423 A1 Aug. 27, 2020

(30) Foreign Application Priority Data
Sep. 12, 2017 (KR) .................. 10-2017-0116665

(51) Int. Cl.
*B25J 9/16* (2006.01)
*B25J 13/08* (2006.01)

(52) U.S. Cl.
CPC .......... *B25J 9/1674* (2013.01); *B25J 9/1638* (2013.01); *B25J 9/1694* (2013.01); *B25J 13/085* (2013.01); *B25J 13/088* (2013.01)

(58) Field of Classification Search
CPC ...... B25J 9/1674; B25J 9/1638; B25J 9/1694; B25J 13/085; B25J 13/088; B25J 9/1676;
(Continued)

(56) References Cited

U.S. PATENT DOCUMENTS 5,142,210 A * 8/1992 Kojima ............. G05B 19/4062
318/275
6,298,283 B1 10/2001 Kato et al.
(Continued)

FOREIGN PATENT DOCUMENTS

EP 0661615 A1 7/1995
EP 3369536 A1 9/2018
(Continued)

OTHER PUBLICATIONS

De Luca, A., et al., "Collision Detection and Safe Reaction with the DLR-III Lightweight Manipulator Arm", Proceedings of the 2006 IEEE/RSJ, International Conference on Intelligent Robots and Systems, Jan. 1, 2006, XP055373295, pp. 1623-1630.
(Continued)

*Primary Examiner* — Abby Y Lin
*Assistant Examiner* — Esvinder Singh
(74) *Attorney, Agent, or Firm* — Sughrue Mion, PLLC

(57) ABSTRACT

As a preferred embodiment of the present invention, a device for controlling a collaborative robot includes a collision detection unit configured to sense a collision of the collaborative robot; a control unit configured to control an operation mode of the collaborative robot when the collision detection unit senses the collision; and a collision countermeasure unit configured to apply, when the collision detection unit senses the collision, a collision compensation value to each of a plurality of joints in the collaborative robot so as to change a proceeding direction of a force applied to the each of the plurality of joints.

20 Claims, 7 Drawing Sheets

(58) Field of Classification Search
CPC ....... B25J 9/04; B25J 9/16; B25J 19/06; B25J 9/1666; B25J 9/042; B25J 19/063; B25J 9/1633; G05B 2219/39237; G05B 2219/39082; G05B 2219/39089; G05B 19/4061; G05B 2219/36356; G05B 2219/37237; G05B 2219/37624; G05B 2219/40317; G05B 2219/40339; G05B 2219/40371; G05B 2219/40497; G05B 2219/49141; G05B 2219/49147; G05B 2219/49155; G05B 2219/49157; G05B 2219/49162; G05B 19/234; G05B 19/255; G05B 19/295; G05B 19/315; G05B 19/355; G05B 19/375; G05B 2219/37319; G05B 2219/39188; G05B 2219/39263; G05B 2219/40599; G05B 2219/41112; G05B 2219/41138; G05B 2219/43117
See application file for complete search history.

(56) References Cited

U.S. PATENT DOCUMENTS

| | | | | |
|---|---|---|---|---|
| 9,737,991 | B2* | 8/2017 | Takahashi | B25J 9/1664 |
| 10,556,353 | B2* | 2/2020 | Su | B25J 13/081 |
| 2008/0231221 | A1* | 9/2008 | Ogawa | B25J 13/085 |
| | | | | 318/568.12 |
| 2009/0171505 | A1 | 7/2009 | Okazaki | |
| 2014/0052154 | A1* | 2/2014 | Griffiths | A61B 34/77 |
| | | | | 606/130 |
| 2018/0311836 | A1* | 11/2018 | Mu | B25J 13/085 |
| 2020/0147787 | A1* | 5/2020 | Takahashi | G05B 19/423 |

FOREIGN PATENT DOCUMENTS

| | | | |
|---|---|---|---|
| JP | 2005-100143 | A | 4/2005 |
| JP | 2007-249524 | A | 9/2007 |
| KR | 10-1214685 | B1 | 1/2013 |
| KR | 10-1329853 | B1 | 11/2013 |
| KR | 10-1487624 | B1 | 1/2015 |
| KR | 10-2015-0080050 | A | 7/2015 |
| WO | 2009093451 | A1 | 7/2009 |
| WO | 2017073052 | A1 | 5/2017 |

OTHER PUBLICATIONS

Communication dated May 17, 2021 issued by the European Patent Office in application No. 17925046.9.
Haibin, W., et al., "Robot Anri Safety Improvement by Position/Torque Switching Control", Communications in computerand information science, Jan. 1, 2011, vol. 225, XP055798000, pp. 131-139.
International Search Report (PCT/ISA/210), issued by International Searching Authority in corresponding International Application No. PCT/KR2017/012466, dated Jun. 11, 2018.
Written Opinion (PCT/ISA/237) issued by the International Searching Authority in corresponding International Application No. PCT/KR2017/012466, dated Jun. 11, 2018.
Communication dated Sep. 8, 2021, issued by the Korean Intellectual Property Office in Korean Application No. 10-2017-0116665.

* cited by examiner

DEVICE AND METHOD FOR CONTROLLING COOPERATIVE ROBOT

CROSS-REFERENCE TO RELATED APPLICATIONS

This application is a National Stage of International Application No. PCT/KR2017/012466 filed Nov. 6, 2017, claiming priority based on Korean Patent Application No. 10-2017-0116665, filed Sep. 12, 2017, the contents of all of which are incorporated herein by reference in their entirety.

TECHNICAL FIELD

The present disclosure relates to a collaborative robot, and more particularly, to a method of controlling a collaborative robot for preventing jamming when a collaborative robot collides with an object.

BACKGROUND ART

General industrial robots are being widely used in production lines in order to perform accurate tasks without monitoring or manipulation by a person. For example, robots used in the car industry perform various operations such as carrying vehicles, performing welding operations, etc.

Unlike the general industrial robots, intelligent service robots perform operations within a space where human beings live and lead their daily lives. Therefore, there is a possibility for an intelligent service robot to collide with a human being and harm the human being, and thus, ensuring the safety of human beings around such robots is of great importance. In particular, this becomes more important for collaborative robots that, among the intelligent service robots, have the highest probability of colliding with human beings.

When a collaborative robot collides with something, an error may occur in a driver of the collaborative robot or an obstacle with which the collaborative robot collides may cause jamming, which may cause a secondary injury. In particular, as a collision time increases, damage caused by the collision becomes severe. Besides, if the collaborative robot collides while moving at a high velocity, the collaborative robot may fall down.

DETAILED DESCRIPTION OF THE INVENTION

Technical Problem

In a preferred embodiment of the present disclosure, provided is a method of reducing a collision time, when a collaborative robot senses a collision, so as to minimize damage of an object with which the collision occurs.

In another preferred embodiment of the present disclosure, provided is a method of rapidly returning to a state prior to a collision and performing work after a collaborative robot senses the collision.

Solution to Problem

As a preferred embodiment of the present disclosure, a device for controlling a collaborative robot includes: a collision detection unit configured to sense a collision of the collaborative robot; a control unit configured to control an operation mode of the collaborative robot when the collision detection unit senses the collision; and a collision countermeasure unit configured to apply, when the collision detection unit senses the collision, a collision compensation value to each of a plurality of joints in the collaborative robot so as to change a proceeding direction of a force applied to the each of the plurality of joints.

As a preferred embodiment of the present disclosure, the control unit may be configured to switch the operation mode from a position mode to a torque mode when the collision detection unit senses the collision.

As a preferred embodiment of the present disclosure, the control unit may switch the operation mode from a torque mode to a position mode after the collision countermeasure unit applies the collision compensation value to change the proceeding direction of the force.

As a preferred embodiment of the present disclosure, when the collision detection unit senses the collision, the collision countermeasure unit may be configured to change a proceeding direction of a force applied to the each of the plurality of joints by applying the collision compensation value differently to each of the plurality of joints in the collaborative robot.

As a preferred embodiment of the present disclosure, the collision detection unit may be configured to sense a collision when a difference between a predicted torque value and a measured torque value exceeds a predetermined value, wherein the predicted torque value may be predicted by the control unit to be required by each joint according to dynamics of the collaborative robot, and the measured torque value is measured from each of the plurality of joints included in the collaborative robot.

As another preferred embodiment of the present disclosure, a device for controlling a collaborative robot includes: a collision detection unit configured to sense a collision of the collaborative robot; a control unit configured to switch an operation mode of the collaborative robot from a position mode to a torque mode when the collision detection unit senses the collision; and a collision countermeasure unit configured to apply a collision compensation value to each of a plurality of joints in the collaborative robot so as to change a proceeding direction of a force in the torque mode, wherein when the collision countermeasure unit applies the collision compensation value, the control unit switches the operation mode again from the torque mode to the position mode.

Advantageous Effect of the Invention

In a preferred embodiment of the present disclosure, in a case where a collision occurs, the collaborative robot is controlled so that the torque is produced in a direction that is opposite to the direction in which the collision occurs, so as to reduce the time period of the collision.

In a preferred embodiment of the present disclosure, the collaborative robot may flexibly deal with the collision by changing the operation mode of the collaborative robot when the collision occurs.

In a preferred embodiment of the present disclosure, various collision states including a location, a level, and a direction of the collision may be effectively sensed to deal with the collision flexibly, and thus, more effective and safe collaboration between a human being and a robot may be allowed.

BEST MODE

Figure 1:
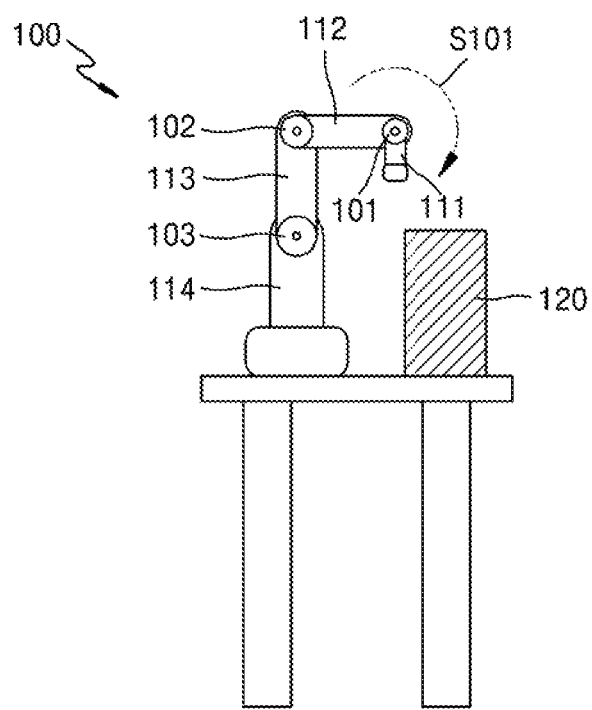
FIG. 1 is a diagram of a collaborative robot as a preferred embodiment of the present disclosure.

As a preferred embodiment of the present disclosure, a device for controlling a collaborative robot includes: a collision detection unit configured to sense a collision of the collaborative robot; a control unit configured to control an operation mode of the collaborative robot when the collision detection unit senses the collision; and a collision countermeasure unit configured to apply, when the collision detection unit senses the collision, a collision compensation value to each of a plurality of joints in the collaborative robot so as to change a proceeding direction of a force applied to the each of the plurality of joints.

MODE OF DISCLOSURE

Hereinafter, preferred embodiments of the present disclosure will be described below with reference to accompanying drawings. Throughout the drawings, like reference numerals denote the same elements. In the detailed description of the embodiments of the present disclosure, detailed depictions of well-known related functions and configurations may be omitted so as not to obscure the art of the present disclosure with superfluous detail.

FIG. 1 is a diagram of a collaborative robot 100 as a preferred embodiment of the present disclosure.

In a preferred embodiment of the present disclosure, the collaborative robot 100 denotes a robot body including links 111, 112, 113, and 114 and joints 101, 102, and 103. In particular, the collaborative robot 100 may be provided in the form of a human hand and arm to provide operations of a hand and an arm.

The collaborative robot 100 includes the plurality of links 111, 112, 113, and 114 connected to one another, and the joints 101, 102, and 103 arranged at connecting portions among the links. As an embodiment of the present disclosure, an integral actuator (see FIG. 2) is mounted in each of the links 111, 112, 113, and 114 to perform rotation around the joints 101, 102, and 103. In FIG. 1, an example in which the joint 101 pivots is shown.

Figure 6:
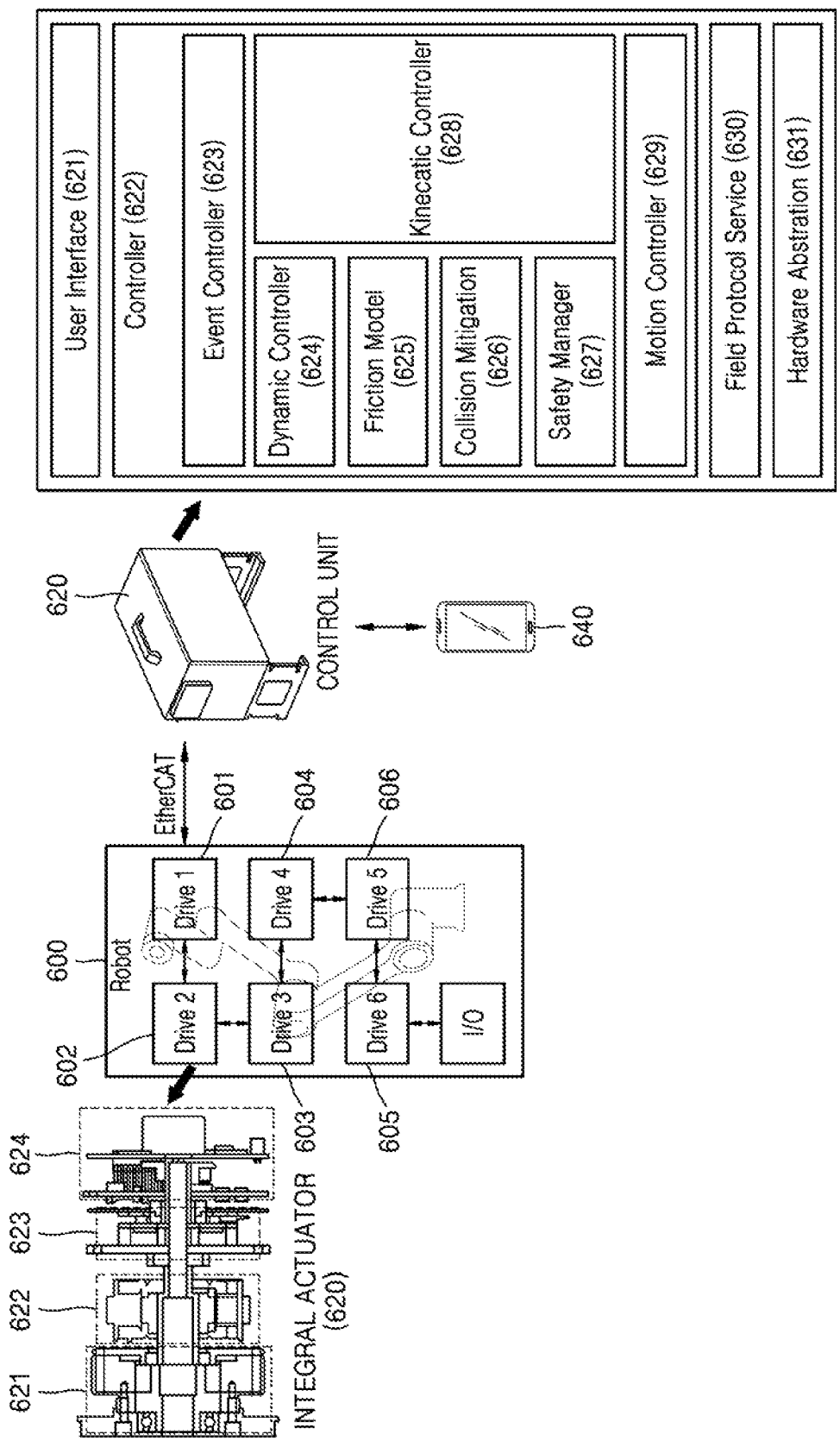
FIG. 6 is a systematic diagram of driving of a collaborative robot, as a preferred embodiment of the present disclosure.

Torque is generated on each of the joints 101, 102, and 103 according to locations, speeds, acceleration, and weights of the links 111, 112, 113, and 114. Each of the joints 101, 102, and 103 may measure the torque between the joint 101, 102, or 103 and the link 111, 112, 113, or 114 generated when a corresponding link among the links 111, 112, 113, and 114 rotates. Each of the joints 101, 102, and 103 measures the torque in real time. Referring to FIG. 6, an integral actuator 620 is provided on each of the joints 101, 102, and 103 to estimate the torque by using a motor torque constant used in a driver of the integral actuator 620.

Figure 2:
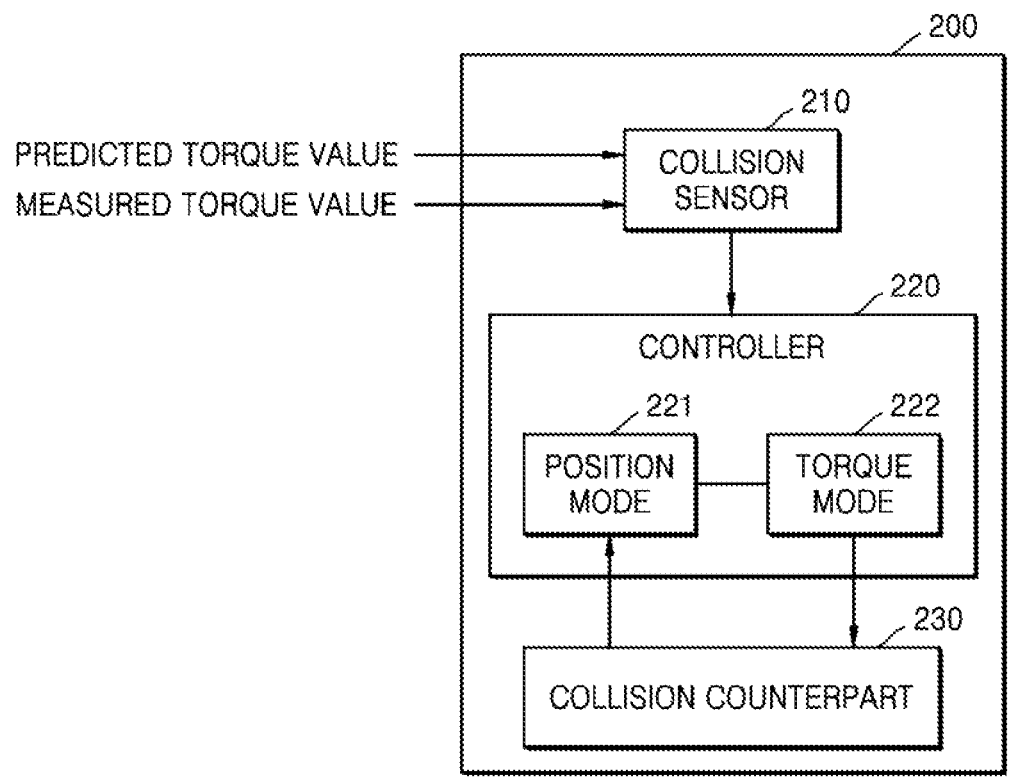
FIG. 2 is a block diagram of an internal structure of a collaborative robot as a preferred embodiment of the present disclosure.

FIG. 2 is a block diagram of an internal structure of a collaborative robot 200 as a preferred embodiment of the present disclosure.

As a preferred embodiment of the present disclosure, the collaborative robot 200 includes a collision detection unit 210, a control unit 220, and a collision countermeasure unit 230.

As a preferred embodiment of the present disclosure, when the collision detection unit 210 senses a collision, the control unit 220 controls a driving mode of the collaborative robot 200. When the control unit 220 receives a collision sensing signal from the collision detection unit 210, the control unit 220 changes the driving mode of the collaborative robot 200 from a position mode to a torque mode, and the collision countermeasure unit 230 applies a collision compensation value to each of the joints (see 101, 102, and 103 of FIG. 1) of the collaborative robot 200 so as to prevent the collaborative robot 200 from being jammed due to the collision (see S320 of FIG. 3). If the collision circumstance is resolved when the collision countermeasure unit 230 applies the collision compensation value, the control unit 220 may change the driving mode again from the torque mode to the position mode.

Each of the components will be described in detail below.

Figure 3:
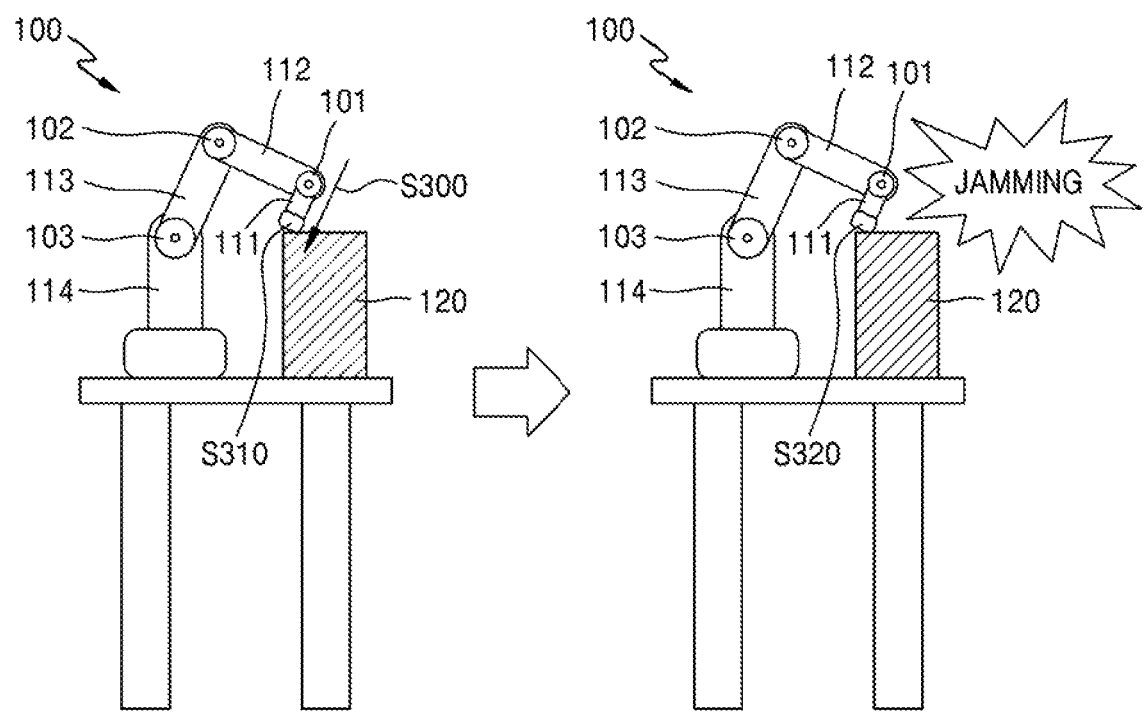
FIG. 3 is a diagram showing an example in which a collaborative robot collides with an obstacle and jamming occurs after the collision, as a preferred embodiment of the present disclosure.

As a preferred embodiment of the present disclosure, the collision detection unit 210 senses a collision between the collaborative robot 100 and an obstacle 120, as shown in FIG. 3. In FIG. 3, when the joint 101 of the collaborative robot 100 rotates (S300), the collaborative robot 100 collides with the obstacle 120 (S310), and after a predetermined time period has passed from the collision of S310, jamming (S320) occurs.

As a preferred embodiment of the present disclosure, the collision detection unit 210 senses a collision when a difference between a predicted torque value and a measured torque value exceeds a predetermined value, wherein the predicted torque value is predicted to be required by each joint according to dynamics of the collaborative robot, and the measured torque value is measured in real-time from each of the plurality of joints constituting the collaborative robot.

As a preferred embodiment of the present disclosure, the control unit 220 may store the predicted torque value that is predicted to be required by each joint in advance. The predicted torque value denotes a torque value calculated by the control unit 220 to be required to actually move the robot. The control unit 220 manages the measured torque value that is obtained by measuring torque at each joint in real time. The measured torque value may denote a torque value that is obtained in real time by measuring a current value of a motor installed on each joint.

The control unit 220 may calculate and store in advance the predicted torque value by using dynamics and a friction model of the collaborative robot. The dynamics denote a motion characteristic according to a geometric relationship between the links and the joints included in the collaborative robot. The dynamics are used to calculate the torque of each joint when the robot moves, via robot dynamics, a location of the robot, velocity, acceleration, gravity, weight of the links in the robot, a centroid of the link, an inertia moment of the link, etc. The dynamics may be represented as an equation involving Inertia terms, Coriolis terms, and gravity terms according to the link. The friction model is obtained by mathematically modeling torque loss between an output of a motor provided in the collaborative robot (see 622 of FIG. 6) and an output of a reducer (see 621 of FIG. 6).

As a preferred embodiment of the present disclosure, when the control unit 220 receives from the collision detection unit 210 a signal indicating occurrence of a collision, the control unit 220 switches an operation mode of the collaborative robot 200 from the position mode to the torque mode.

As a preferred embodiment of the present disclosure, when the collaborative robot 200 operates in the position mode, the collaborative robot 200 is controlled according to a position command without regard to external force such as a collision. When the collaborative robot 200 collides with an object in the position mode, a driver of the integral actuator including a feedback loop generates a position command without regard to the external force, so as to control the dynamics of the collaborative robot 200. The dynamics of the collaborative robot 200 are controlled according to the position command provided by the control unit 220 to drivers (see 601 to 606 of FIG. 6) of the integral actuators respectively mounted on the links (see 111, 112, 113, and 114 of FIG. 1) of the collaborative robot 200. The position command includes information about a location the motor has to reach.

However, if the collaborative robot 200 continuously operates in the position mode until the control unit 220 senses the collision of the collaborative robot 200 and sends a stop command to the collaborative robot 200, a jamming state (S320) may occur in a direction in which the collision has occurred as shown in FIG. 3. Also, since the collaborative robot 200 stays at the stopped location until the stop command is retrieved, the jamming state may be maintained. To address this, according to the embodiment of the present disclosure, the operation mode of the collaborative robot 200 is switched to the torque mode when the collision occurs.

As a preferred embodiment of the present disclosure, when the collaborative robot 200 operates in the torque mode, the collaborative robot 200 is controlled according to a torque command without regard to an external force such as the collision. When the collaborative robot 200 collides with an object in the torque mode, drivers (see 601 to 605 of FIG. 6) of the integral actuators are configured as open loops and generate a torque command without regard to the external force so as to control the dynamics of the collaborative robot 200. The control unit 220 calculates a torque value output from a motor of the integral actuator to provide the calculated value to the driver (see 622 of FIG. 6) so as to control the dynamics of the collaborative robot 200.

In a preferred embodiment of the present disclosure, while the collaborative robot 200 operates in the torque mode, a user may move the collaborative robot 200 manually to a safe place, if necessary.

In a preferred embodiment of the present disclosure, the collision countermeasure unit 230 calculates a collision compensation value based on a location, a velocity, and an acceleration value of each joint in the collaborative robot 200 when a collision occurs. The collision countermeasure unit 230 may identify a degree and a direction of the collision based on a location, a velocity, and an acceleration value of each joint in the collaborative robot 200 when the collision occurs, and may calculate a collision compensation value that may be applied as a reaction force against the degree and the direction of the collision.

For example, in a case where a collision occurs at a joint k in the collaborative robot 200 having n joints, external force applied to joints 1 to k rapidly increases due to the collision, and external force applied to joints k+1 to n does not largely change. It may be highly probable that a variation in the location, the velocity, and the acceleration of the joints is large on the joints 1 to k, to which the rapidly changed external force is applied. However, it is highly probable that the variation in the location, the velocity, and the acceleration of the joints is small on the joints k+1 to n, and the external force applied thereto does not largely change.

As a preferred embodiment of the present disclosure, when the collision of the collaborative robot 200 is sensed, the collision countermeasure unit 230 may calculate the collision compensation value that is proportional to a location variation amount of each joint. The location variation amount is detected by a location vector, and the collision compensation value that is proportional to the location variation amount is calculated and may be applied differently to each joint.

As a preferred embodiment of the present disclosure, the collision of the collaborative robot 200 is detected, the collision countermeasure unit 230 may calculate the collision compensation value that is proportional to a velocity value of each joint. A greater collision compensation value may be applied to a joint having a higher velocity value.

As a preferred embodiment of the present disclosure, when the collision of the collaborative robot 200 is sensed, the collision countermeasure unit 230 may calculate the collision compensation value that is proportional to a variation in the acceleration value of each joint.

As a preferred embodiment of the present disclosure, when the collision of the collaborative robot 200 is detected, the collision countermeasure unit 230 may calculate the collision compensation value based on at least one variable from among the location, the velocity, and the acceleration of each joint.

As a preferred embodiment of the present disclosure, the collision countermeasure unit 230 may set a range of the collision compensation value with reference to the location and the velocity of the collaborative robot 200 during an operation of the collaborative robot 200 at a predetermined time earlier than the detection of the collision or an operation of the collaborative robot 200 immediately before the detection of the collision.

As a preferred embodiment of the present disclosure, in a case where the collision detection unit 210 senses the collision, the control unit 220 switches the operation mode from a position mode 221 to a torque mode 222 so that the collision countermeasure unit 230 applies the collision compensation value to release the collision state of the collaborative robot 200, and the control unit 220 may re-set the operation mode from the torque mode 222 to the position mode 221.

FIG. 3 is a diagram showing an example in which the collaborative robot 100 collides with an obstacle 120 (S310) and jamming occurs after the collision (S320), as a preferred embodiment of the present disclosure.

In a case where the obstacle 120 is located on a proceeding path of the link 111 when the collaborative robot 100 moves as shown in FIG. 3, the link 111 of the collaborative robot 100 collides with the obstacle 120 (S310), and after the collision, the jamming may occur (S320).

In a preferred embodiment of the present disclosure, when the collaborative robot 100 collides with the obstacle 120 (S310), a reaction force applied in opposition to the direction in which the collaborative robot 100 moves may be applied as the collision compensation value.

Figure 4:
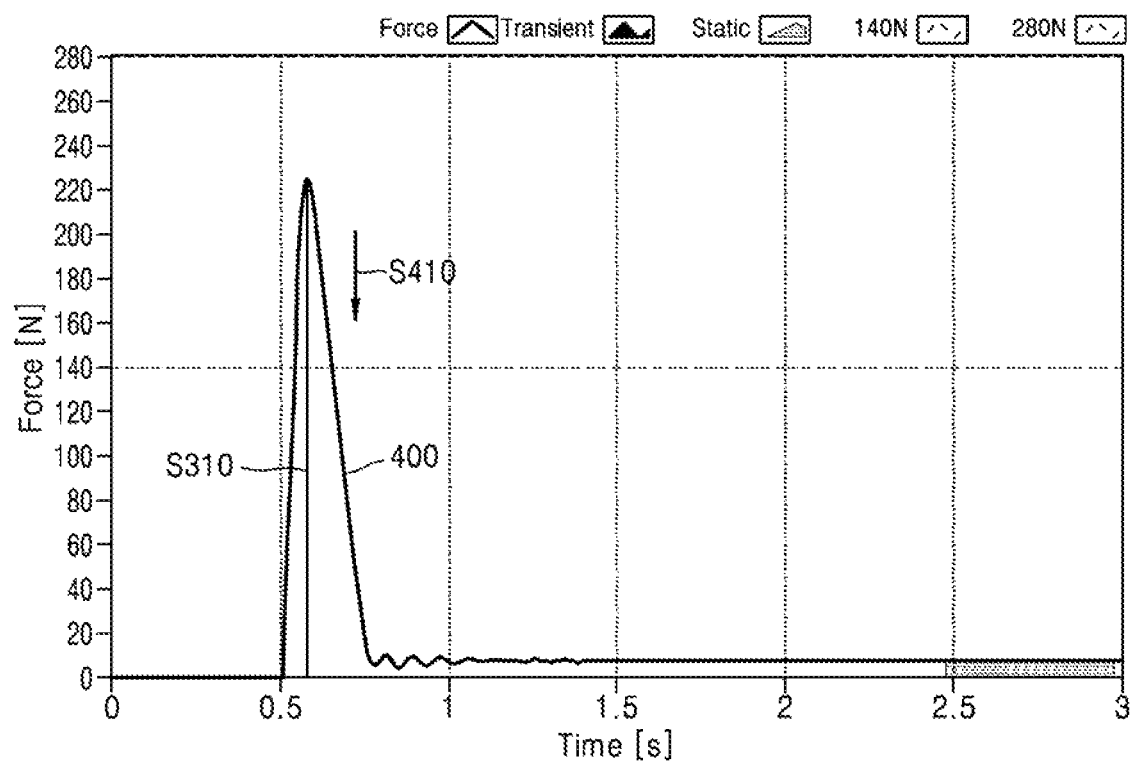
FIGS. 4 and 5 respectively show variations in force applied to the collaborative robot according to time, in a case where the collaborative robot collides with an obstacle and jamming occurs after the collision like in the embodiment illustrated in FIG. 3, as preferred embodiments of the present disclosure.
Figure 5:
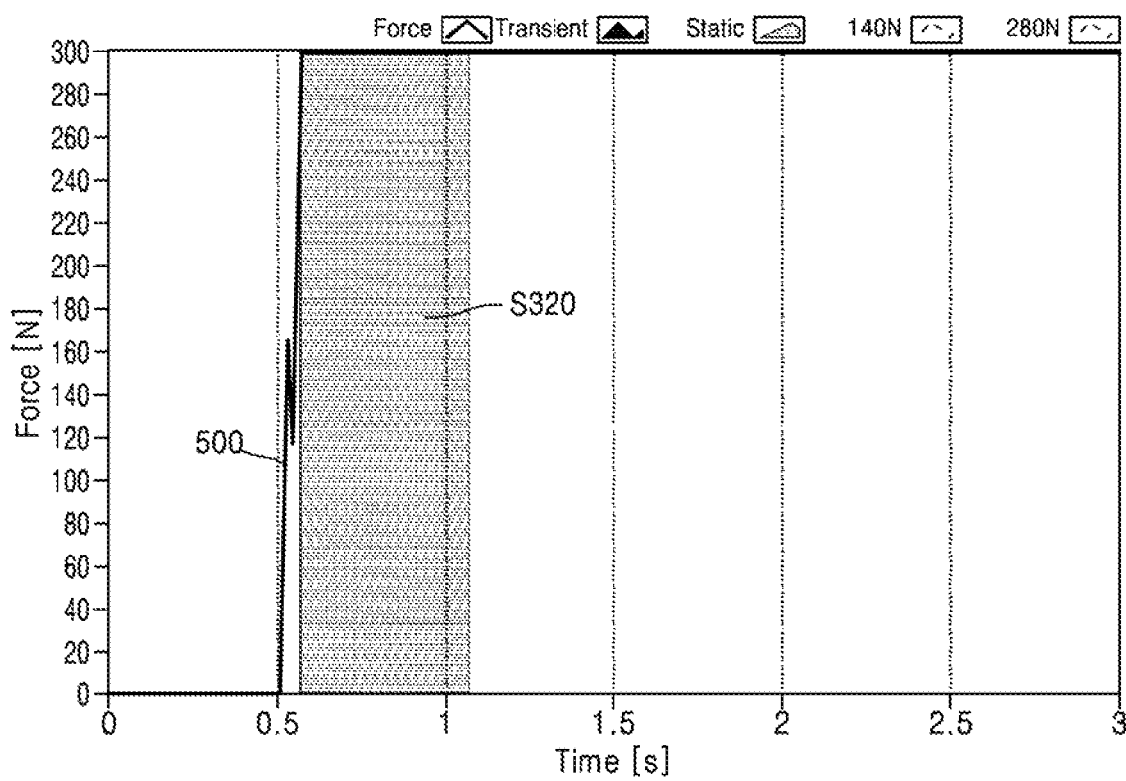

FIGS. 4 and 5 respectively show variations in force applied to the collaborative robot 100 according to time, in a case where the collaborative robot 100 collides with the obstacle 120 and jamming occurs after the collision like in the embodiment illustrated in FIG. 3, as preferred embodiments of the present disclosure.

FIG. 4 shows a plot 400 of a variation in a force applied to a portion of the collaborative robot 100 when the collaborative robot 100 collides with the obstacle 120 in FIG. 3. It may be identified that collision occurs at 0.5 sec and a force is applied in a direction in which the collision (S310) occurs. In a preferred embodiment of the present disclosure, a collision compensation value S410 may be set so as to be applied in a direction opposite the force applied in the direction in which the collision occurs (S310).

FIG. 5 shows a plot 500 of a variation in a force applied to a jammed portion of the collaborative robot 100 when the jamming (S320) occurs after the collaborative robot 100 collides with the obstacle 120 in FIG. 3.

FIG. 6 is a systematic diagram of driving a collaborative robot 600 as a preferred embodiment of the present disclosure.

The collaborative robot 600 may be implemented to include a plurality of joints and links, and an integral actuator 620 may be provided on each of the plurality of joints. FIG. 6 shows an example, in which six integral actuators 601 to 606 are provided on six joints of the collaborative robot 600. The integral actuator 620 is a module in which a reducer 621, a motor 622, a brake 623, and a driver 624 are assembled as one, and the driver 624 controls the motor 622. FIG. 6 shows six drivers 601 to 606, which may be replaced by six actuators.

The collaborative robot 600 may perform communication with the control unit 610 via a control protocol. The control unit 620 may also communicate with a terminal 640 via wired or wireless communication, and functions of the control unit 620 may be controlled via the terminal 640.

Hereinafter, an internal structure of the control unit 620 and characteristics of each component will be described below.

According to the internal structure of the control unit 610, the control unit 620 includes a user interface 621, a control unit 622, a field protocol service 630, and a hardware abstraction layer 631.

As a preferred embodiment of the present disclosure, the control unit 622 includes an event control unit 623, a dynamic control unit 624, a friction modeling unit 625, a collision manager 626, a safety manager 627, a kinematic control unit 628, and a motion control unit 629.

As a preferred embodiment of the present disclosure, the event control unit 623 detects an event occurring in the collaborative robot 600. The event includes a collision event.

As a preferred embodiment of the present disclosure, the dynamic control unit 624 and the friction modeling unit 625 calculate an estimated torque value applied to each joint of the collaborative robot 600, and stores the estimated torque value. The dynamic control unit 624 calculates a torque value required by each of the dynamics of the robot. The friction modeling unit 625 mathematically models a difference between an output torque of the motor and an output torque of the reducer. As an example, loss generated due to mechanical elements in the reducer and the joints of the robot may be mathematically modeled.

The collision manager 626 calculates the collision compensation value based on the location, the velocity, and the acceleration value of each joint in the collaborative robot 600 when the collision occurs. The safety manager 627 may be implemented so that the collaborative robot 600 may be moved to a safe place manually when the collaborative robot 600 is in the torque mode.

The kinematic control unit 628 and the motion control unit 629 may be implemented to determine the motion characteristics based on the geometric relationship between the joints and the links of the collaborative robot so that the links may rotate about the joints to conduct various movements. The field protocol service 630 is configured to manage a control protocol between the collaborative robot 600 and the control unit 620. An example of the control protocol may include EtherCAT.

Figure 7:
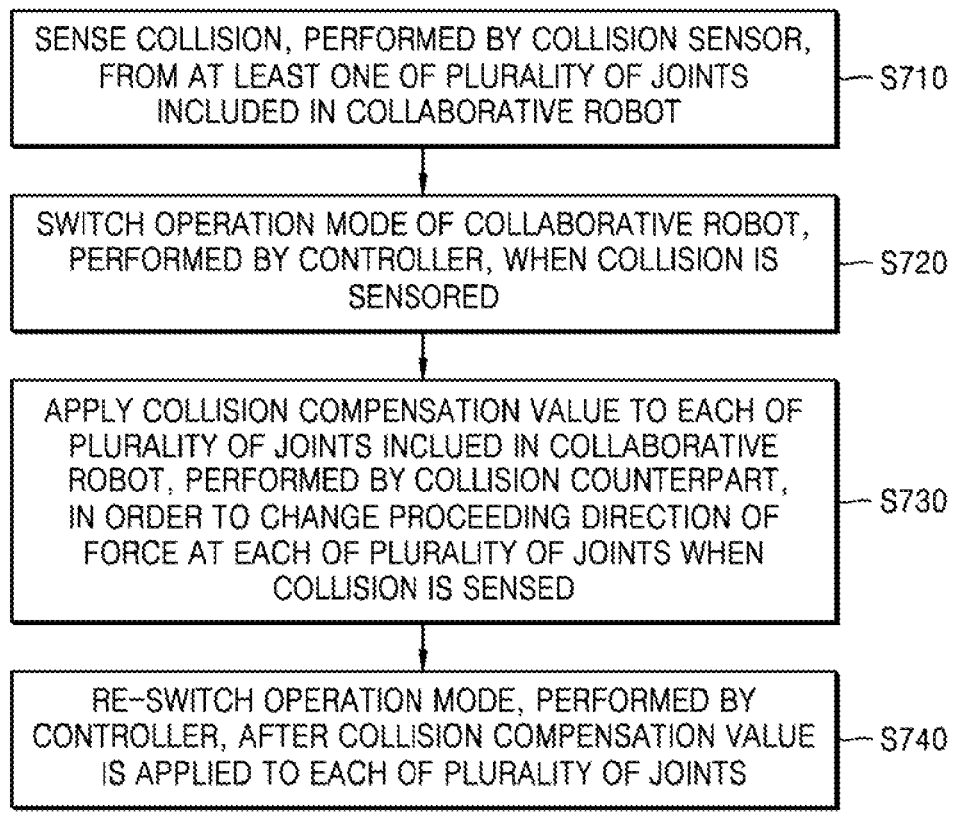
FIG. 7 is a flowchart illustrating a method of controlling a collaborative robot when a collision occurs, as a preferred embodiment of the present disclosure.

FIG. 7 is a flowchart illustrating a method of controlling a collaborative robot when a collision occurs, as a preferred embodiment of the present disclosure.

In a preferred embodiment of the present disclosure, the collision detection unit senses a collision from at least one of a plurality of joints included in the collaborative robot (S710). The collision detection unit determines that a collision has occurred when a difference between the predicted torque value and the measured torque value exceeds a predetermined value.

When the collision detection unit senses the collision, the control unit switches the operation mode of the collaborative robot from the position mode to the torque mode to flexibly deal with the external force (S720). When the operation mode is switched to the torque mode, the collision countermeasure unit applies a collision compensation value corresponding to a reaction force against the force caused by the collision to each of the plurality of joints in the collaborative robot, so as to change a direction of application of the force to each of the plurality of joints (S730).

In another preferred embodiment of the present disclosure, after the collision compensation value is applied to each of the plurality of joints, the control unit may re-switch the operation mode of the collaborative robot from the torque mode to the position mode (S740).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure as defined by the following claims.

The invention claimed is:

1. A device for controlling a collaborative robot, the device comprising:
   a collision sensor configured to sense a collision of the collaborative robot; and
   a controller comprising at least one processor configured, based on the collision sensor sensing the collision and without a user intervention, to:
      change an operation mode of the collaborative robot to a torque mode;
      apply a collision compensation value as a reaction force to each of a plurality of joints in the collaborative robot;
      change a proceeding direction of a force applied to each of the joints according to the collision compensation value, and release the collision,
   wherein the collision compensation value is proportional to at least a location variation of each of the joints measured during a predetermined time period prior to sensing the collision by the collision sensor.

2. The device of claim 1, wherein the controller is configured to change the operation mode from a position mode to the torque mode based on the collision sensor sensing the collision, wherein, in the position mode, the controller is configured to execute a position command controlling at least one motor included in the joints to move at least one link connected to the motor based on information about a target position without regard to the collision, and wherein, in the torque mode, the controller is configured to execute a torque command calculating a torque value output from the motor and controlling the link to move based on the torque value without regard to the collision.

3. The device of claim 2, wherein the position mode is an operation mode that is robust to a force applied to the collaborative robot according to the collision.

4. The device of claim 2, wherein the torque mode is an operation mode that is flexible to a force applied to the collaborative robot according to the collision.

5. The device of claim 2, wherein based on the controller changing the operation mode into the torque mode, a location of the collaborative robot is able to be manually changed in the torque mode.

6. The device of claim 1, wherein the controller is configured to change the operation mode from the torque mode to a position mode after the controller applies the collision compensation value to change the proceeding direction of the force, wherein, in the position mode, the controller is configured to execute a position command controlling at least one motor included in the joints to move at least one link connected to the motor based on information about a target position without regard to the collision, and wherein, in the torque mode, the controller is configured to execute a torque command calculating a torque value output from the motor and controlling the link to move based on the torque value without regard to the collision.

7. The device of claim 1, wherein, based on the collision sensor sensing the collision, the controller is configured to change the proceeding direction of the force applied to each of the joints by applying the collision compensation value differently to each of the joints in the collaborative robot.

8. The device of claim 1, wherein, based on the collision sensor sensing the collision, the controller is configured to calculate the collision compensation value based on at least one selected from a location, a velocity, and an acceleration of each of the joints, and apply the collision compensation value to each of the plurality of j oints to change the proceeding direction of the force applied to each of the joints.

9. The device of claim 8, wherein the collision compensation value is further proportional to at least one of a velocity and a variation in an acceleration value of each of the joints measured during the predetermined time.

10. The device of claim 1, wherein the collision sensor is configured to sense the collision based on a difference between a predicted torque value and a measured torque value exceeding a predetermined value, and wherein the predicted torque value is predicted by the controller to be required by each of the joints according to dynamics of the collaborative robot, and the measured torque value is measured from each of the joints.

11. The device of claim 1, wherein the collision compensation value comprises:

a first collision compensation value which is proportional to the location variation of each of the joints measured during the predetermined time period; and at least one of a second collision compensation value which is proportional to a velocity of each of the joints measured during the predetermined time period, and a third collision compensation value which is proportional to a variation in an acceleration value of each of the joints measured during the predetermined time period.

12. The device of claim 11, wherein the collision compensation value comprises the first to third collision compensation values.

13. A device for controlling a collaborative robot, the device comprising:

a collision sensor configured to sense a collision of the collaborative robot; and a controller comprising at least one processor configured, based on the collision sensor sensing the collision and without a user intervention, to:

change an operation mode of the collaborative robot to a torque mode;

apply a collision compensation value as a reaction force to each of a plurality of joints in the collaborative robot;

change a proceeding direction of a force applied to each of the joints according to the collision compensation value, and remove the collision; and change the operation mode of the collaborative robot to a position mode after the collision is removed, wherein the collision compensation value is proportional to at least a location variation of each of the joints measured during a predetermined time period prior to sensing the collision by the collision sensor.

14. The device of claim 13, wherein in the torque mode, a location of the collaborative robot is able to be manually changed.

15. The device of claim 13, wherein the collision compensation value is a reaction force against the force applied to each of the joints in the collaborative robot due to the collision, and is calculated based on a torque value that is obtained based on a current value of a motor detected from each of the joints.

16. The device of claim 13, wherein the collision compensation value comprises:

a first collision compensation value which is proportional to the location variation of each of the joints measured during the predetermined time period; and at least one of a second collision compensation value which is proportional to a velocity of each of the joints measured during the predetermined time period, and a third collision compensation value which is proportional to a variation in an acceleration value of each of the joints measured during the predetermined time period.

17. The device of claim 16, wherein the collision compensation value comprises the first to third collision compensation values.

18. A method of controlling a collaborative robot, the method comprising:

sensing, by a collision sensor, a collision of at least one of a plurality of joints in the collaborative robot;

changing, by a controller, an operation mode of the collaborative robot to a torque mode based on the sensing the collision;

applying, by the controller, a collision compensation value as a reaction force to each of a plurality of joints in the collaborative robot;

changing, by the controller, a proceeding direction of a force applied to each of the joints according to the collision compensation value and without a user intervention, and releasing the collision, wherein the collision compensation value is proportional to at least a location variation of each of the joints measured during a predetermined time period prior to sensing the collision by the collision sensor.

19. The method of claim 18, wherein the collision compensation value comprises:

a first collision compensation value which is proportional to the location variation of each of the joints measured during the predetermined time period; and at least one of a second collision compensation value which is proportional to a velocity of each of the joints measured during the predetermined time period, and a third collision compensation value which is proportional to a variation in an acceleration value of each of the joints measured during the predetermined time period.

20. The method of claim 19, wherein the collision compensation value comprises the first to third collision compensation values.

* * * * *